United States Patent [19]

Bougis

[11] Patent Number: 5,420,900
[45] Date of Patent: May 30, 1995

[54] INTERNAL EQUIPMENTS FOR A NUCLEAR REACTOR HAVING SPACER COLUMNS AND CONTROL CLUSTER GUIDES

[75] Inventor: Jean-Claude Bougis, Courbevoie, France

[73] Assignee: Framatome, France

[21] Appl. No.: 131,638

[22] Filed: Oct. 5, 1993

[30] Foreign Application Priority Data

Oct. 5, 1992 [FR] France ............... 92 11763

[51] Int. Cl.⁶ ........................... G21C 1/04
[52] U.S. Cl. .................. 376/353; 376/285; 376/205
[58] Field of Search ........... 376/353, 285, 205, 461, 376/261, 282; 926/DIG. 129

[56] References Cited

U.S. PATENT DOCUMENTS

| | | | |
|---|---|---|---|
| 4,752,438 | 6/1988 | Desfontaines et al. | 376/285 |
| 4,842,815 | 6/1989 | Cauquelin et al. | 376/463 |
| 5,006,305 | 4/1991 | Denizou | 376/353 |
| 5,106,572 | 4/1992 | Chevereau | 376/353 |

FOREIGN PATENT DOCUMENTS

| | | |
|---|---|---|
| 138477 | 9/1984 | European Pat. Off. |
| 329536 | 2/1989 | European Pat. Off. |
| 363710 | 9/1989 | European Pat. Off. |
| 428433 | 11/1990 | European Pat. Off. |
| 456562 | 5/1991 | European Pat. Off. |
| 467093 | 6/1991 | European Pat. Off. |

*Primary Examiner*—Donald P. Walsh
*Assistant Examiner*—Meena Chelliah
*Attorney, Agent, or Firm*—Pollock, Vande Sande & Priddy

[57] ABSTRACT

The equipment comprises a bottom plate formed with outlet openings for the coolant, a top plate, spacer rods interconnecting the plates, and cluster guides for guiding control clusters. At least some of the guides have respective top lengths that project above the top plate and bottom lengths that extend between the plates. Each bottom length includes a base bearing against a frustoconical seat secured to the bottom plate, and it is subjected to the force of resilient means. Together, the lengths of each guide constitute a one-piece cartridge suitable for insertion in a corresponding column. The guide also includes a cap for receiving the top length, which cap is fixed to the top plate against which the resilient means bear.

9 Claims, 3 Drawing Sheets

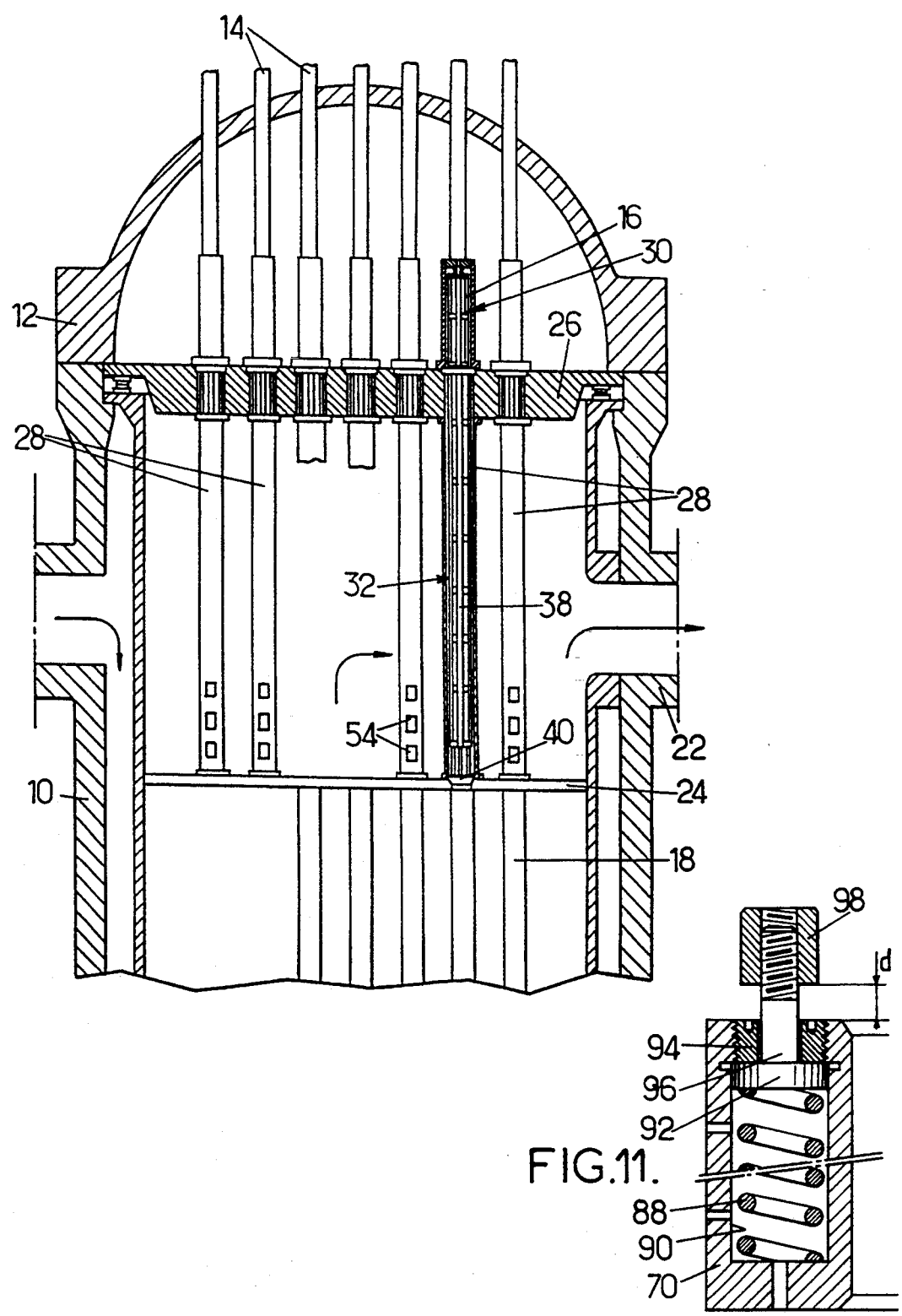

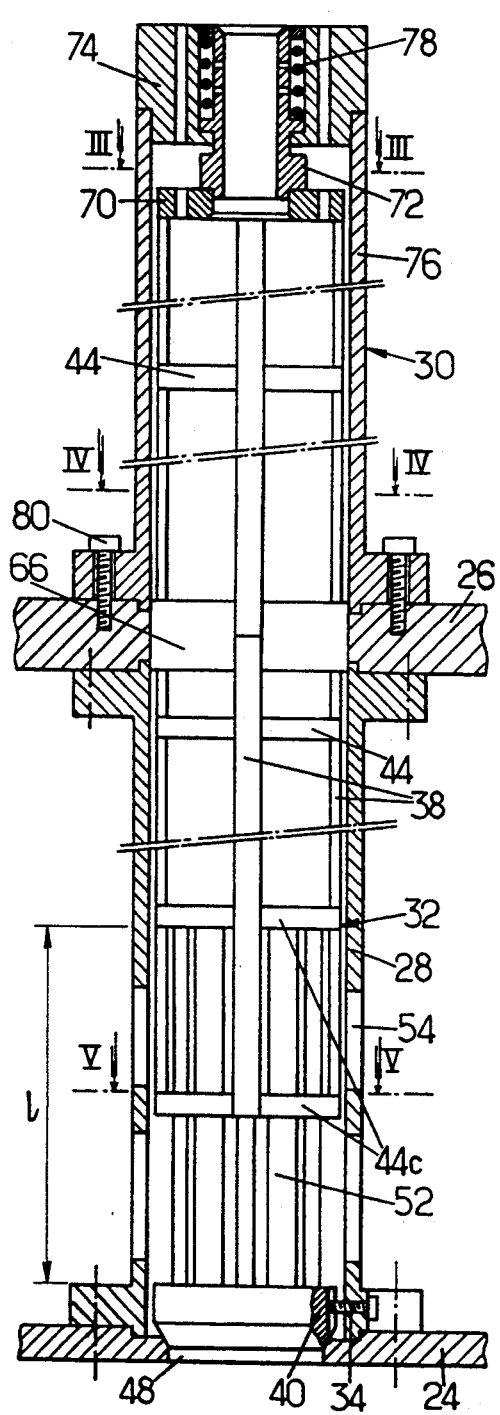
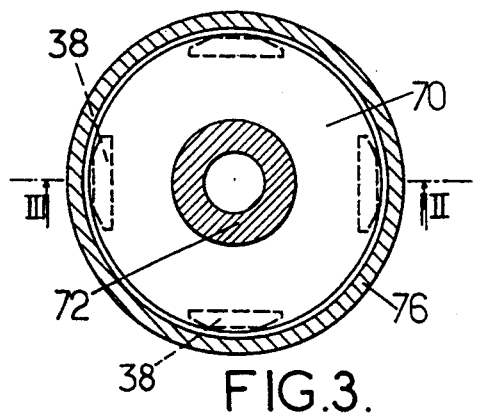
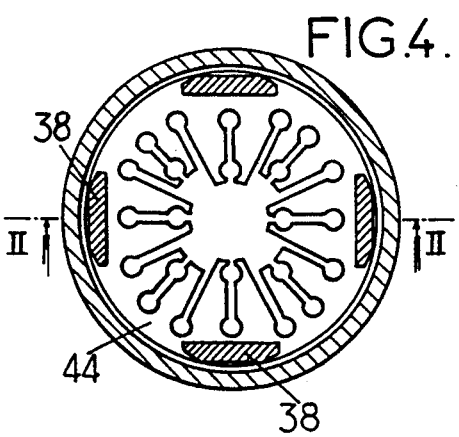
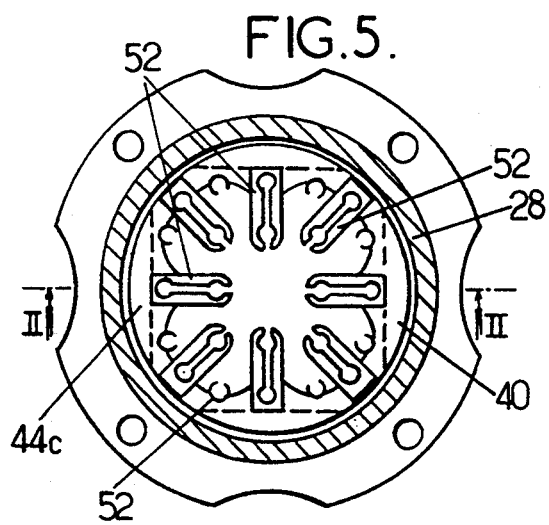

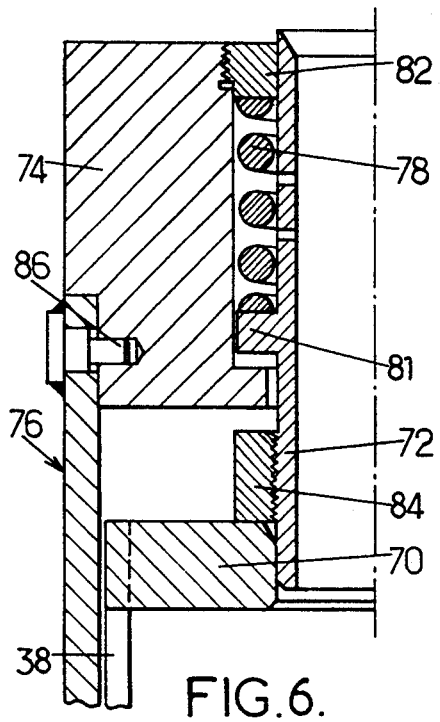
FIG.6.
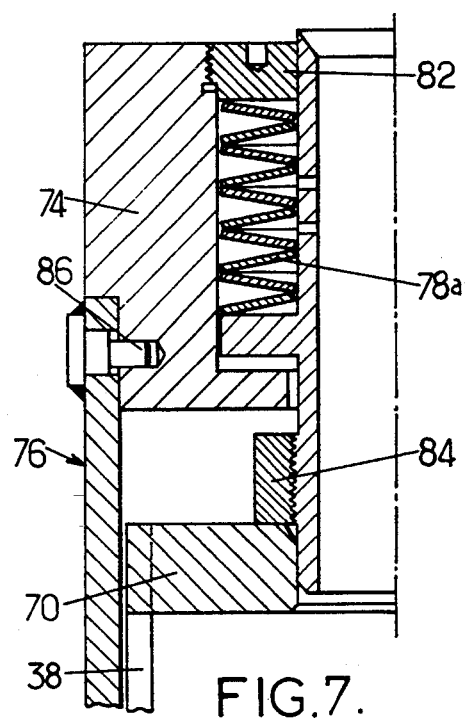
FIG.7.
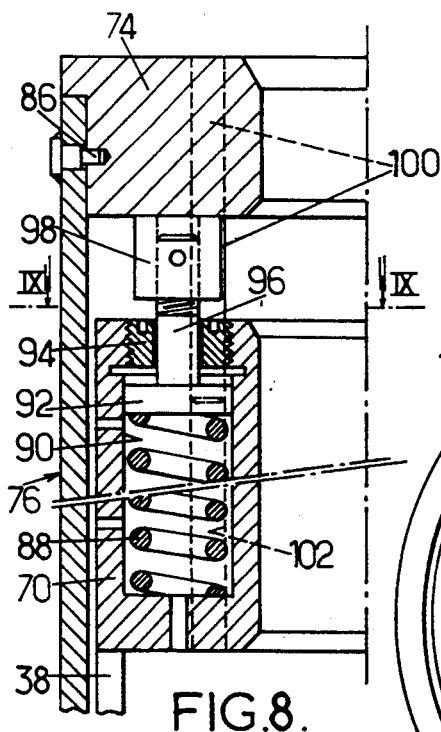
FIG.8.
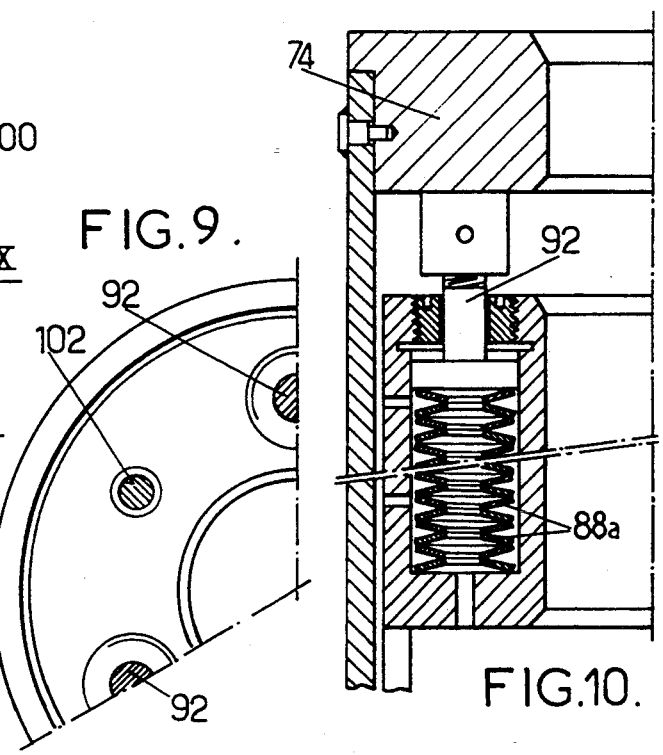
FIG.9.
FIG.10.

INTERNAL EQUIPMENTS FOR A NUCLEAR REACTOR HAVING SPACER COLUMNS AND CONTROL CLUSTER GUIDES

BACKGROUND OF THE INVENTION

The present invention relates to upper internal equipments for a nuclear reactor, and it is particularly applicable to reactors that are cooled and moderated by pressurized water.

More particularly, it relates to internal equipments located above the core of a nuclear reactor, the equipment comprising a bottom plate formed with openings allowing coolant to leave the core, a top plate, spacer columns interconnecting the plates, and cluster guides for control clusters that are vertically displaceable between a lower position in which they are inserted in the core and an upper position in which they are out of the core, at least some of said guides each having an upper length that projects above the top plate and a bottom length that extends between the plates and that is within a respective spacer column.

More particularly, the invention relates to equipments of this kind in which the bottom length includes a support base for abutment on a frustoconical seat secured to the bottom plate and is subjected to the action of resilient means exerting a force that urges the base against the seat, as described in U.S. Pat. No. 5,183,628.

SUMMARY OF THE INVENTION

It is an object of the present invention to provide equipments enabling cluster guides placed in columns to be installed and replaced simply, and also enabling a structure to be preassembled in a factory and subsequently connected directly to the top plate.

To this end, there are provided equipments of the kind defined above in which the two lengths of each guide constitute a one-piece cartridge suitable for insertion in a corresponding column, and in which the guide further includes a casing for receiving the upper length, which casing is fixed to the top plate constituting an abutment for the resilient means.

Typically, the two lengths each comprise a plurality of longitudinal members (e.g., four) that are regularly spaced apart angularly and that interconnect a higher plate subjected to the action of the resilient means and cross guide plates for cluster rods that are insertable in the guide, together with split sleeves and tubs for continuous guidance of the rods in the lowest portion of the bottom length. The longitudinal members extend to the top of the cartridge. They may either be interrupted from the cross plate of the bottom length at which the split sleeves and tubes for continuous guidance begin, or they may extend up to a bottom cross plate (or even up to the base).

The invention will be better understood from the following description of particular embodiments given as by way of example. The description refers to the accompanying drawings.

BRIEF DESCRIPTION OF THE DRAWINGS

FIG. 1 is a simplified view in cross-section on a vertical plane showing the top portion of a reactor to which the invention may be applied;

FIG. 2 is a cross-sectional view on line II—II of FIGS. 3 to 5 showing, on a larger scale, a guide device constituting an embodiment of the invention and applicable to the reactor of FIG. 1;

FIGS. 3 to 5 are cross-sectional views on lines III—III, IV—IV, and V—V of FIG. 2;

FIGS. 6 and 7 are detail views on a larger scale showing two possible structures for the top portion of the guide in FIG. 2;

FIG. 8 is similar to FIG. 6 and shows a modified embodiment;

FIG. 9 is a cross-sectional view on line IX—IX of FIG. 8;

FIG. 10 is similar to FIG. 8 and shows another modified embodiment; and

FIG. 11 is a diagram showing a step in assembling the cartridge of a guide as shown in FIGS. 8 and 9.

DETAILED DESCRIPTION

By way of example, the invention is described in its application to a pressurized water reactor of the kind shown in FIG. 1, which reactor comprises a vessel 10 that withstands the pressure of the water which constitutes both the coolant and the moderator. The vessel is closed by a cover 12 which carries mechanisms 14 for displacing the control clusters, only one of which, 16, is shown. The vessel 10 contains the core 18 which is built up by juxtaposing assemblies each of which comprises a framework and a bundle of fuel rods that are distributed in a regular array. The framework of each assembly comprises guide tubes (not shown) in which absorbent rods belonging to the control clusters can slide.

The core is surmounted by a structure, e.g., a welded structure which is designated by the term "upper internal equipments". This structure performs several functions. It collects the flow of high temperature water leaving the core upwardly and it deflects it to the outlet nozzle 22 from the vessel 18. Finally, it guides the vertical displacement of the control clusters 16 associated with at least some of the assemblies.

The upper internal equipments shown in FIG. 1 comprise a bottom plate 24 which receives thrust from the assemblies subjected to the upward flow of pressurized water, and a top plate 26 which conveys the resultant of the forces applied to the upper internal equipment overall to the vessel 10 and to its cover 12. The plates 24 and 26 are interconnected by tubular spacer columns 28.

Cluster guides are provided vertically, each in line with a mechanism 14. Each cluster guide may be considered as comprising a top length 30 and a bottom length 32. The bottom lengths 32 are contained in respective spacer column 28. The top lengths project above the top plate 26 which may be regarded as being a support plate for the cluster guides.

Together the two lengths constitute a one-piece cartridge which is insertable as a whole by lowering it into a column. The cartridge has a framework that terminates at the bottom in a base 40 provided with indexing means for imparting a determined angular orientation to the framework in the column.

As shown in FIG. 2, the indexing means for the bottom lengths comprise a sliding key system between the base 40 and the column 28 and are constituted by a peg 34 which engages in a vertical groove in the base 40.

The framework shown by way of example in FIGS. 2 to 5 comprises:

a plurality of vertical longitudinal members or beams 38 that are uniformly distributed angularly, and that are four in number, for example;

regularly distributed cross plates or "cards" 44 which are cut out for the openings to correspond to the distribution of neutron absorbent rods in the control cluster and which are interconnected by the longitudinal members 38; and split sleeves and tubes 52 for guiding the rods of the cluster, protecting the rods against the flow of coolant and replacing the longitudinal members between the bottommost plate 44c and the base 40.

The base 40 is designed to bear against a seat formed on the bottom plate 24 or secured thereto. The shape of the bearing surface between the seat and the thrust surface of the base is such that it tends to center the base relative to the bearing surface. In general, the bearing surface is frustoconical and the thrust surface is likewise frustoconical or is in the form of a spherical cap.

In the embodiment shown in FIG. 2, the guiding split sleeves and tubes 52 connect together two cross-plates 44c and the base 40. They provide continuous guidance for the rods of the cluster over a length l. In contrast, guidance for the rods is discontinuous in that portion of the bottom length that is not provided with split sleeves and tubes, and also in the top length.

Again referring to the embodiment shown in FIG. 2, each support column 28 disposed around a bottom length 32, is terminated by flanges, including one fixed to the downwardly facing face of the top plate 26 and another fixed to the bottom plate 24, e.g., by screws. The reactor is designed so that the coolant leaving the assemblies passes through passages 48 formed in the bottom plate 24, each in alignment with a corresponding fuel assembly, and then through the bases 40. Openings 54 are provided in the bottom portions of the columns.

The columns may be fixed to the plates 24 and 26 by any conventional method. For example, they may be provided with flanges that bear against the mutually confronting surfaces of the two plates and are fixed by means of screws (not shown).

The top length 30 of each guide is terminated by a top plate 70 fixed to the longitudinal members 38 and provided with upwardly-projecting centering means 72. The centering means may have various different structures. It is designed to engage in a reception plate 74 belonging to a casing 76 which is fixed to the top plate 26.

The casing 76 surrounds the top length 30. In the example shown in FIG. 2, it is centered on the plate 26 by an annular projection and it is fixed on the plate by screws 80 that pass through the bottom flange of the cap.

The framework may include a flange or a centering card 66 for centering the cartridge inside the casing and in the column, at the level of the top plate 26.

The internal equipments also include resilient means for pressing each base 40 against its seat, which may surround a corresponding passage 48.

In the embodiment shown in FIGS. 2 and 6, the resilient means comprise a single helical spring 78 which is compressed between the centering means 72 and the reception plate 74. The centering means may be constituted, in particular, by a bush having a collar 81 against which the spring 78 bears, which spring is held captive by a nut 82 screwed into the reception plate 74.

The central bore of the nut 82 and the bottom portion of the reception plate 74 then guide the centering means.

The vertical level of the centering means 72 relative to the highest plate 70 may be made adjustable. In the example shown in FIG. 6, the centering means 72 bear against the highest plate 70 through a nut 84 which is adjustably screwed on a thread of the centering means whose end has a sliding fit in a bore through the highest plate 70.

The device is simpler to assemble than devices in previously known systems. The cartridge can be fully assembled in a workshop. The centering means 72 can be installed in the reception plate 74 while still in the workshop. The reception plate is then fixed to the remainder of the casing, e.g., by means of welded pegs 86. The cartridge is installed on site. The casing is installed, and insertion of the centering means in the highest plate 70 can be facilitated by chamfers. The cap is then pushed in by tightening the screws 80, thereby compressing the spring 78.

The control clusters continue to be actuated in conventional manner by means of a rod passing through the central bore of the centering means 72.

The embodiment shown in FIG. 7 (where members corresponding to those of FIG. 6 are designated by the same reference numerals) differs from that of FIG. 6 only in that the helical spring 78 is replaced by a stack of Belleville washers 78a.

In the embodiment shown in FIGS. 8 and 9, the resilient means comprise a plurality of identical spring sets that are uniformly distributed around the guide axis and that are accommodated in the highest plate 70. There may be three such spring sets, for example. Each spring set comprises a helical spring 88 contained in a chamber 90 which is formed in the highest plate 70. The spring is compressed between the end wall of the chamber and a plunger 92 which is retained by a plug 94. The plunger has an extension 96 that passes through the plug and that is designed to receive the thrust from the reception plate 74. In order to adjust the application force exerted by the springs 88, the plate 74 bears against the extensions 96 via respective internally threaded heads 98 that are screwed on the extensions.

Centering spindles 100 can be fitted in the reception plate 74 and may slide in holes 102 formed in the highest plate 70.

The embodiment shown in FIG. 10 differs from the preceding embodiment only in that the helical springs 88 are replaced by stacks of Belleville washers 88a.

The guides shown in FIGS. 8 and 10 are just as simple to assemble as the preceding guides. The springs 88 are installed in the chambers 90 in a workshop. The plungers 92 are located in the springs. The plugs 94 are installed to close the chambers. They may be designed to impart a first prestress to the springs 88. The nuts 98 are screwed and adjusted: the distance d between each nut 98 and the corresponding plug 94 determines the compression stroke of the springs.

Once the cartridges have been fully made up, they can be installed by introducing them into the columns. Thereafter the casings are installed and secured by means of screws engaging the top plate 24.

I claim:

1. A nuclear reactor having a core, upper internal equipment and a plurality of clusters of control rods vertically movable between a lower position in which they are in the core and an upper position in which they are out of the core, said upper internal equipment comprising:

a bottom plate formed with openings allowing coolant to leave the core upwardly;

a top plate above said bottom plate;

a plurality of vertical spacer columns interconnecting the plates; and a plurality of cluster guides, each for receiving one of said control clusters, at least some of said cluster guides each having:

a one-piece cartridge suitable for insertion in a respective one of said spacer columns, comprising a top length that projects above the top plate and a bottom length that extends between the bottom plate and the top plate, that is located within the respective spacer column, and that includes a support base bearing against a frustoconical seat of said bottom plate, said bottom length and top length constituting a framework which comprises, in addition to said support base, vertical longitudinal members and cross-plates connected to the vertical members and providing discontinuous guidance of the control rods of one of said clusters in the bottom length and top length;

an external casing slidable over and receiving the top length, secured to the top plate at a lower end thereof and having a reception plate at an upper end thereof; and resilient means located between said top length and said reception plate for exerting a force that urges the support base down against the seat.

2. Internal equipment according to claim 1, wherein said cartridge further includes split sleeves and tubes for providing continuous guidance of the control rods in a lowest portion of the bottom length.

3. Internal equipment according to claim 1, wherein said reception plate slidably receives centering means projecting into a central bore of a highest plate of said cartridge and having an abutting connection with said highest plate, and wherein said resilient means comprise a spring retained in said reception plate and exerting said force on said centering means.

4. Internal equipment according to claim 3, wherein said centering means is a bush having a flange bearing against a spring constituting said resilient means and held captive by a nut screwed into said reception plate.

5. Internal equipment according to claim 4, wherein said centering means bears on the highest plate via a nut which is adjustably screwed on said centering means.

6. Internal equipment according to claim 1, wherein said top length has a highest end plate and said resilient means comprises a plurality of identical spring sets uniformly distributed around an axis of the cluster guide accommodated in the highest plate.

7. Internal equipment according to claim 6, wherein each said spring set comprises a spring contained in a chamber formed in the highest plate and compressed between an end wall of the chamber and a plunger for transmitting thrust from said reception plate.

8. Internal equipment according to claim 6, wherein said spring is constituted by a stack of Belleville washers.

9. Internal equipment according to claim 6, wherein each said spring is constituted by a helical spring.

* * * * *